(12) United States Patent
Van De Sluis et al.

(10) Patent No.: US 11,997,774 B2
(45) Date of Patent: May 28, 2024

(54) DETERMINING AN ADJUSTED DAYLIGHT-MIMICKING LIGHT OUTPUT DIRECTION

(71) Applicant: SIGNIFY HOLDING B.V., Eindhoven (NL)

(72) Inventors: Bartel Marinus Van De Sluis, Eindhoven (NL); Marcellinus Petrus Carolus Michael Krijn, Eindhoven (NL); Leendert Teunis Rozendaal, Valkenswaard (NL); Michel Cornelis Josephus MArie Vissenberg, Roermond (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 99 days.

(21) Appl. No.: 17/799,293

(22) PCT Filed: Feb. 15, 2021

(86) PCT No.: PCT/EP2021/053580
§ 371 (c)(1),
(2) Date: Aug. 12, 2022

(87) PCT Pub. No.: WO2021/165173
PCT Pub. Date: Aug. 26, 2021

(65) Prior Publication Data
US 2023/0074460 A1     Mar. 9, 2023

(30) Foreign Application Priority Data

Feb. 17, 2020   (EP) ..................... 20157551

(51) Int. Cl.
*H05B 47/125*   (2020.01)
*H05B 47/16*    (2020.01)

(52) U.S. Cl.
CPC ........... *H05B 47/125* (2020.01); *H05B 47/16* (2020.01)

(58) Field of Classification Search
CPC ...... H05B 47/10; H05B 47/125; H05B 47/16; H05B 45/10
See application file for complete search history.

(56) References Cited

U.S. PATENT DOCUMENTS

| 723,481 A | 3/1903 | Ochschim |
|---|---|---|
| 5,515,069 A | 5/1996 | Dillon, III |

(Continued)

FOREIGN PATENT DOCUMENTS

| CN | 101363580 A | 2/2009 |
|---|---|---|
| EP | 2021117 A1 | 2/2009 |

(Continued)

*Primary Examiner* — Jimmy T Vu

(57) ABSTRACT

A system for mimicking daylight in a space by using one or more light sources (11,12) having a redirectable light output is configured to determine a daylight-mimicking light output direction (51,52) for the light output in the space based on a time of day, determine an estimated or detected position of an object, person (59) or animal in the space, determine an adjusted light output direction (51,53) for the one or more light sources in dependence on the daylight-mimicking light output direction and the estimated or detected position, and control the one or more light sources to render the light output in the adjusted light output direction.

13 Claims, 8 Drawing Sheets

(56) References Cited

U.S. PATENT DOCUMENTS

| | | |
|---|---|---|
| 5,589,741 A | 12/1996 | Res |
| 2006/0170376 A1 | 8/2006 | Piepgras et al. |
| 2009/0244891 A1 | 10/2009 | Miskin |
| 2010/0084996 A1* | 4/2010 | Van De Sluis ...... H05B 47/155 315/312 |
| 2013/0293152 A1 | 11/2013 | Barroso et al. |
| 2014/0292206 A1 | 10/2014 | Lashina et al. |
| 2018/0279439 A1 | 9/2018 | Takeshita et al. |

FOREIGN PATENT DOCUMENTS

| | | | |
|---|---|---|---|
| JP | 2001176679 | A | 6/2001 |
| JP | 2008202283 | A | 9/2008 |
| JP | 2009043629 | A | 2/2009 |
| WO | 2017144303 | A1 | 8/2017 |

\* cited by examiner

20 May - 11.09 AM

DETERMINING AN ADJUSTED DAYLIGHT-MIMICKING LIGHT OUTPUT DIRECTION

CROSS-REFERENCE TO PRIOR APPLICATIONS

This application is the U.S. National Phase application under 35 U.S.C. § 371 of International Application No. PCT/EP2021/053580, filed on Feb. 15, 2021, which claims the benefit of European Patent Application No. 20157551.1, filed on Feb. 17, 2020. These applications are hereby incorporated by reference herein.

FIELD OF THE INVENTION

The invention relates to a system for mimicking daylight in a space by using one or more light sources having a redirectable light output.

The invention further relates to a method of mimicking daylight in a space by using one or more light sources having a redirectable light output.

The invention also relates to a computer program product enabling a computer system to perform such a method.

BACKGROUND OF THE INVENTION

People appreciate (simulated) sunlight, because of its aesthetic and biological effects. Artificial daylight systems that attempt to mimic natural daylight are known and have been implemented in large buildings and/or urban areas in which many spaces have only limited access to natural daylight. Known artificial daylight systems are configured to mimic natural daylight conditions with varying degrees of accuracy. For example, some artificial daylight systems mimic changes in color temperature and light intensity throughout the day in synch with typical daylight patterns. Daylight mimicking solutions such as the CoeLux range of products enable the creation of an artificial sunbeam illuminating an indoor space.

In order to create a credible (believable) virtual sunlight effect, the mimicked sunlight should follow the natural trajectory of the sun, preferably for a given time-of-year and based on input on geo-location and -orientation. US 2014/0292206 A1 discloses a method of controlling illumination that comprises adjusting a direction of light output of a lighting fixture to mimic the likely actual direction of generated sunlight through a natural light transmissive element. The method further comprises adjusting a light output characteristic of the lighting fixture based on a climate-related parameter for the geographical location of the lighting fixture.

US 2018/0279439 A1 discloses an illumination system which includes: a first luminaire that emits first illumination light having a color simulating a sky; a second luminaire that is disposed in a same space as the first luminaire, the second luminaire projecting, on an object, second illumination light simulating sunlight to create a sunny portion on the object; and a controller that causes the first luminaire to emit the first illumination light according to an environment reproduction condition.

A drawback of the system of US 2018/0279439 A1 and the method of US 2014/0292206 A1 is that its daylight-mimicking behavior restricts the visual experience.

SUMMARY OF THE INVENTION

It is a first object of the invention to provide a system for mimicking daylight, which creates an enhanced visual experience.

It is a second object of the invention to provide a method of mimicking daylight, which creates an enhanced visual experience.

In a first aspect of the invention, a system for mimicking daylight in a space by using one or more light sources having a redirectable light output comprises at least one input interface, at least one control interface, and at least one processor configured to determine a daylight-mimicking light output direction for said light output in said space based on a time of day, obtain input via said at least one input interface, determine an estimated or detected position of an object, person or animal in said space from said input, determine an adjusted light output direction for said one or more light sources in dependence on said daylight-mimicking light output direction and said estimated or detected position, and control, via said at least one control interface, said one or more light sources to render said light output in said adjusted light output direction.

Therewith, a daylight-mimicking system is provided which determines a virtual sunbeam trajectory in a space, e.g. a room, based on input with regards to time and based on the determined position of one or more detected (current) or estimated (e.g. expected or typical) positions in the room. This creates an enhanced visual experience.

In order to create a credible (believable) virtual sunlight effect, the mimicked sunlight should follow the natural trajectory of the sun, preferably for a given time-of-year and based on input on geo-location and -orientation. However, small deviations from such a determined natural trajectory may enhance the created visual experience. For instance:

- The virtual sunbeam could highlight objects in the room which deserve visual attention (e.g. artworks, working surfaces, signage). In this way, the virtual sunbeam could provide (temporary) accent or task lighting targeted at those objects.
- The virtual sunbeam could avoid being directed towards (the faces of) people or animals in order to minimize visual discomfort. By detecting where users are located, their orientation (with respect to a virtual sunbeam), what their preferences or activities are, the sunbeam may be adjusted accordingly.
- The virtual sunbeam could be directed towards (body parts of) people, animals or plants, in order to provide a (temporary) light boost according to a circadian rhythm, light therapy or light recipe. In this case, it may be required to identify the living object and retrieve a light recipe or lighting need associated with it and adjust the light properties of the virtual sunbeam accordingly. The light beam may need to be directed at a wall/object within the user's field of view (rather than at the user himself) to provide sufficient light entering their eyes to produce the wanted effect.

Only part of the sunbeam trajectory may be adjusted or the entire sunbeam trajectory may be adjusted. The latter keeps the sun beam trajectory organic and credible while taking the object positions into account. First, the system determines a reference trajectory of the sunbeam, which could be received from a daylight model and/or from other nearby daylight mimicking units. Secondly, based on the determined positions, the system determines a deviated trajectory (optimized for perception/appreciation) of the virtual sunbeam.

Said at least one processor may be configured to determine said detected position of said person based on a detected position of a mobile device carried, worn or held by said person. Alternatively, the detected position may be detected with the help of a camera, for example. The estimated position may be determined from user input or from a building information model, for example.

Said at least one processor may be configured to obtain a geographic location and/or a spatial orientation of said one or more light sources, said spatial orientation indicating a direction relative to a geographic cardinal direction, and determine said daylight-mimicking direction for said light output further based on said geographic location and/or said spatial orientation. This results in the best daylight-mimicking effect. Not determining the daylight-mimicking direction based on the geographic location and the spatial orientation of the light sources would create a contrast between the artificial light and the natural light and would be undesirable if the natural light would be (very) noticeable. The geographic location and the spatial orientation of the light sources may be automatically determined or manually configured, for example.

Said at least one processor may be configured to determine said adjusted light output direction such that a deviation between said adjusted light output direction and said daylight-mimicking light output direction stays below a predetermined maximum. For example, the difference between a reference trajectory and a deviated trajectory may be limited to the predetermined maximum. In the case that the room provides a visual indication of the reference (e.g. via a real window or via another daylight mimicking unit), this deviation is preferably lower than it would otherwise be, e.g. at most 20% instead of at most 30-35%.

Said at least one processor may be configured to determine said adjusted light output direction such that said light output illuminates said object, person or animal. For example, object positions may be current, expected or typical positions of a user or a user's head which should not be illuminated by the light output (sunbeam), whereby in more advanced cases also the gaze direction, user activity, or position of a user (display) device is determined. In an advanced case, the virtual sunbeam trajectory could be determined such that it avoids glare from specular reflections from (planar) objects, which cause visual discomfort to one or more persons in a room.

Alternatively or additionally, said at least one processor may be configured to determine said adjusted light output direction such that said light output does not illuminate said object, person or animal. For example, object positions may be decorative objects, working surfaces or information signs in the room, which could be targeted by the virtual sunbeam to provide (temporary) accent or task lighting on those objects.

Said at least one processor may be configured to determine said adjusted light output direction further in dependence on an activity performed by said person. People typically like (simulated) sunlight only if it matches their mood and activities, but do not appreciate when it hinders their activities or does not match their mood. In an advanced case, the system only adjusts the directional (sun)light effect if it coincides with the detected user activity. The system may also activate non-visual effects dependent on the activity. For instance, add infrared-based heat sensation only when relaxing, not when working.

Input indicating the activity performed by the person may be received from a user or configuration input, for example. For instance, during the configuration of the daylight system, the user may indicate that the daylight system is installed in a working room, where a lot of computer work takes place. The user may also indicate activity areas on a floorplan, e.g. indicate the position of a desk and/or computer and indicate in what room part the user is typically relaxing.

Said at least one processor may be configured to identify said person, determine a preference associated with said identified person, and determine said adjusted light output direction further in dependence on said preference. For example, some people may like being illuminated with artificial light, while others do not. Said preference may indicate whether said person would like a light boost according to a circadian rhythm, light therapy or light recipe, for example.

Said at least one processor may be configured to determine a further daylight-mimicking direction for said light output based on a later time of day, control, via said at least one control interface, said one or more light sources to render diffused light, control, via said at least one control interface, said one or more light sources to render said light output in said further daylight-mimicking direction or a further adjusted direction after rendering said diffused light, said further adjusted direction being based on said further daylight-mimicking direction. By rendering diffused light when changing the light output direction, the change may be made less noticeable if the change is noticeably large.

Said at least one processor may be configured to determine a further daylight-mimicking direction for said light output based on a later time of day, obtain, via said at least one input interface, presence information indicative of whether a person is present, control, via said at least one control interface, said one or more light sources to render said light output in said further daylight-mimicking direction or a further adjusted direction upon determining that said person is not present, said further adjusted direction being based on said further daylight-mimicking direction. The light output direction may be changed when no one is present, because the change will then not be noticeable.

Said at least one processor may be configured to obtain, via said at least one input interface, an orientation, gaze direction and/or eye state of said person, determine whether said person can see and/or is looking at said light output being rendered in a current direction based on said orientation, gaze direction and/or eye state, control, via said at least one control interface, said one or more light sources to render said light output in said further daylight-mimicking direction or said further adjusted direction upon determining that said person cannot see or is not looking at said light output being rendered in said current direction. If a person is present, the light output direction may be changed when the person cannot see or is not looking at the light output, e.g. if changes to the light output direction are noticeably large. For example, a person may be determined not to be looking at the light output if he is not paying (most of his) attention to the light output, e.g. if he is looking in another direction all of the time or most of the time. The eye state may be open or closed, for example.

In a second aspect of the invention, a method of mimicking daylight in a space by using one or more light sources having a redirectable light output comprises determining a daylight-mimicking light output direction for said light output in said space based on a time of day, determining an estimated or detected position of an object, person or animal in said space, determining an adjusted light output direction for said one or more light sources in dependence on said daylight-mimicking light output direction and said estimated or detected position, and controlling said one or more light sources to render said light output in said adjusted light output direction. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for mimicking daylight in a space by using one or more light sources having a redirectable light output.

The executable operations comprise determining a daylight-mimicking light output direction for said light output in said space based on a time of day, determining an estimated or detected position of an object, person or animal in said space, determining an adjusted light output direction for said one or more light sources in dependence on said daylight-mimicking light output direction and said estimated or detected position, and controlling said one or more light sources to render said light output in said adjusted light output direction.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
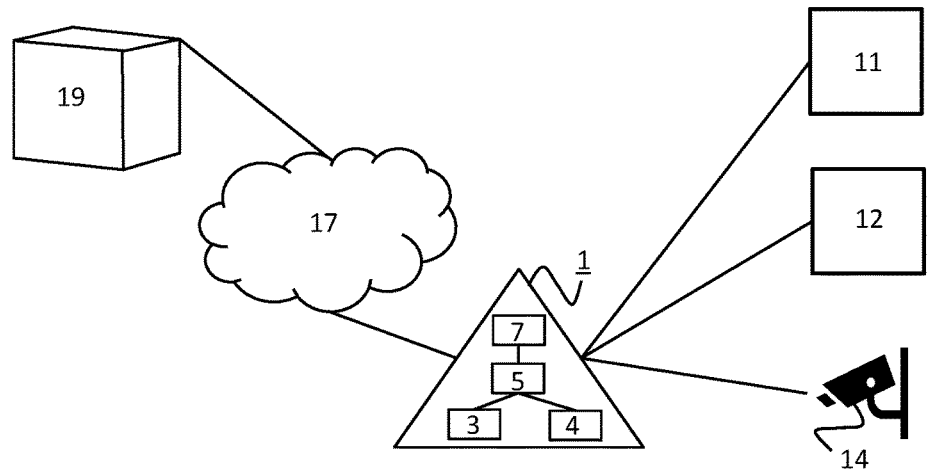
FIG. 1 shows an embodiment of the system.

FIG. 1 shows an embodiment of the system for mimicking daylight in a space by using one or more light sources having a redirectable light output: a controller 1. The controller 1 controls light sources 11 and 12. The light sources 11 and 12 may be spot lights, for example. The light sources 11 and 12 may comprise LED modules, for example. The light output of the light sources 11 and 12 may be mechanically or electronically redirectable, for example. U.S. Pat. No. 9,668,312 B2 describes an example of a redirectable daylight solution. The redirectable light output (i.e. virtual sunbeam) may also be realized by a pixelated spotlight, such as disclosed in, for example, WO 2018/134028 A1.

The controller 1 may communicate with the light sources 11 and 12 via one or more wired and/or wired communication technologies, e.g. via Zigbee or Bluetooth. The controller 1 is connected to the Internet 17, e.g. via a wireless Internet access point (not shown). An Internet server 19 is also connected to the Internet 17.

The controller 1 comprises a receiver 3, a transmitter 4, a processor 5, and memory 7. The processor 5 is configured to determine a daylight-mimicking light output direction for the light output in the space based on a time of day, obtain input via the receiver 3, and obtain an estimated or detected position of an object, person or animal in the space from the input. The processor 5 may be configured to obtain a current time of day from a timer circuit comprised in the controller 1 (not shown) or from a time server (e.g. NTP server) on the Internet, for example. Internet server 19 may be a time server, for example. The processor 5 may be configured to obtain images from a camera 14 and detect a position of an object, person or animal from the obtained camera images, for example.

The processor 5 is further configured to determine an adjusted light output direction for the light sources 11 and 12 in dependence on the daylight-mimicking light output direction and the estimated or detected position, and control, via the transmitter 4, the one or more light sources 11 and 12 to render the light output in the adjusted light output direction.

The camera 14 may be used to detect the position of specific parts of an object, person or animal, such as the head and/or hands of a person. People may not want a directional light beam on their head, whereas, when reading from paper, a directional light beam towards their hands/book may be desirable.

The processor 5 may be configured to obtain a geographic location and/or a spatial orientation of the light sources 11 and 12 and determine the daylight-mimicking direction for the light output further based on the geographic location and/or the spatial orientation. The geographical location of the light sources 11 and 12 may be manually configured, e.g. via a mobile device, or may be obtained from an Internet server that is able to map IP addresses to geographical locations. Internet server 19 may be such a server, for example. The spatial orientation indicates a direction relative to a geographic cardinal direction and may be obtained using information from a compass comprised in the light sources 11 and 12, for example.

In the embodiment of the controller 1 shown in FIG. 1, the controller 1 comprises one processor 5. In an alternative embodiment, the controller 1 comprises multiple processors. The processor 5 of the controller 1 may be a general-purpose processor, e.g. ARM-based, or an application-specific processor. The processor 5 of the controller 1 may run a Unix-based operating system for example. The memory 7 may comprise one or more memory units. The memory 7 may comprise one or more hard disks and/or solid-state memory, for example.

The receiver 3 and the transmitter 4 may use one or more wired or wireless communication technologies such as Zigbee to communicate with the light sources 11 and 12 and Ethernet to communicate with an Internet access point, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver and the transmitter 4 are combined into a transceiver. The controller 1 may comprise other components typical for a controller such as a power connector. The invention may be implemented using a computer program running on one or more processors.

In the embodiment of FIG. 1, the system is a controller (e.g. a bridge or gateway). In an alternative embodiment, the system may be another device, e.g. a lighting device. In the embodiment of FIG. 1, the system comprises a single device. In an alternative embodiment, the system comprises multiple devices.

Figure 2:
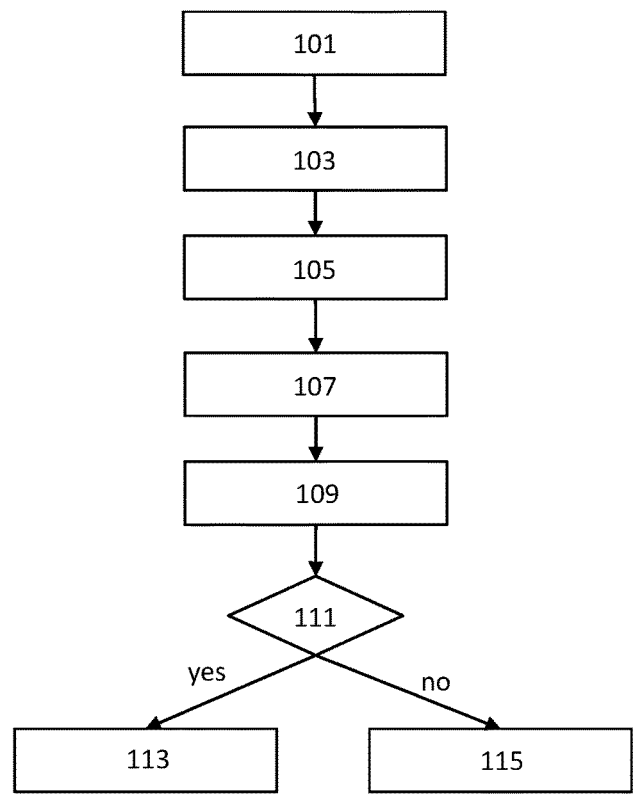
FIG. 2 is a flow diagram of a first embodiment of the method.

A first embodiment of the method of mimicking daylight in a space by using one or more light sources having a redirectable light output is shown in FIG. 2. A step 101 comprises determining a current time of day. This current time of day may be used in a step 105 or in a step 113, for example. A step 103 comprises obtaining a geographic location and/or a spatial orientation (indicating a direction relative to a geographic cardinal direction) of the one or more light sources.

Step 105 comprises determining a daylight-mimicking light output direction for the light output in the space based on a time of day (e.g. the current time of day) and based on the geographic location and/or the spatial orientation determined in step 103. In step 105, based on input of the current season or date and time, and input about the geo-position and -orientation, a first daylight simulation output for one or more light sources, i.e. daylight mimicking lighting units, may be determined.

For instance, daylight models may be queried using the system's current date and geo-location in order to retrieve a pre-defined dynamic daylight simulation scheme which would represent the actual ambient lighting conditions at that location. This may include taking into account the actual weather conditions (or even forecasted weather conditions). A reference trajectory of the artificial sunbeam may be determined in step 105, for example. If a 3D model of the room interior is available, including the position of the light source(s), the position and trajectory of the volumetric sunbeam could be calculated from this 3D model.

A step 107 comprises determining an estimated or detected position of an object, person or animal in the space. In this embodiment, input is received in step 107 with regard to the position(s) of one or more objects, persons or animals in the space, e.g. room, including further properties of those one or more objects, persons or animals (e.g. class, identity, associated lighting preferences etc.). Advanced sensors could be used to detect those positions. For instance, one or more cameras could detect the position of users. Alternatively, RF-based positioning, e.g. of personal (portable, wearable) devices, could be used to determine user positions. Users may also be tracked over a longer time period and typical, e.g. frequent, user positions may be determined based on the acquired tracking data. Such frequent user positions may be dependent on the time of day, time of week, or the season, for example.

Besides users, also objects in the room may be detected. For instance, a user may use a camera to make an omni-directional room scan, whereby objects are being detected and a relative position within the 3D room interior is determined for each object. Objects could be decorative objects such as artworks or statues, information objects (e.g. signage) or working surfaces, which could benefit from a directional light beam effect, or which should be avoided (e.g. when the object is a computer monitor or shiny surface that can give an unpleasant glare when watched from the user's current position).

Alternatively or additionally, the typical places where users can sit/stand, and where users cannot sit/stand may be determined. This helps determine possible/impossible user positions in the space.

It may possible for the user to label objects in an onscreen 3D image or model of the room's interior. For example, objects could be labelled by a user according to the effect they should have on the virtual sun's trajectory: for example, "attract", "avoid", or "neutral" (the default). Such a labelling may also be performed without the use of an image or model, e.g. using RF- or camera-based positioning. For example, a user may be able to simply walk around the room with his phone and indicate on his phone at what positions/areas directional light beams are desirable or undesirable.

Typical user positions may also be determined from a Building Information Model (BIM). The BIM may comprise information on locations and/or orientations of rooms, luminaires, furniture, and/or windows, for example. The BIM may be received from a BIM system, for example.

A step 109 comprises determining an adjusted light output direction for the one or more light sources in dependence on the daylight-mimicking light output direction determined in step 105 and the estimated or detected position obtained in step 107. The adjusted light output direction may be determined such that the light output illuminates the object, person or animal or such that the light output does not illuminate the object, person or animal, for example.

In step 109, an adjusted daylight simulation or sunbeam trajectory is determined based on the obtained positions and optionally, based on further properties associated with the one or more objects, persons or animals. For example, the sunbeam trajectory may be adjusted in order to avoid shining a sunbeam on a user. For instance, the system may have determined that the reference sunbeam trajectory coincides with a typical position of the user (or his computer monitor) at his desk. In this case, the system may determine an offset of the one or more reference sunbeam trajectories (see example of FIG. 5). In an alternative implementation, only the user is avoided and a detour is made around the user position only and the reference trajectory is followed elsewhere (see example of FIG. 4).

In addition to or instead of avoiding users, the artificial sunbeam may also try to target certain objects, such as decorative objects in the room. For instance, a reference sunbeam may be determined to come close to an artwork, and therefore the beam may be adjusted in order to shine exactly on the artwork instead of partly illuminating it, or illuminating the artwork's pedestal rather than the artwork itself. It may also be possible to adjust the timing and schedule of the sunbeam trajectory in such a way that the time of the sunbeam on the artwork is (slightly) pro-longed, compared to the time that the sunbeam is illuminating segments of the room which are less appealing. In a similar way, messy or ugly objects or areas can be identified which could be avoided or only temporarily illuminated by the virtual sunbeam.

A step 111 comprises determining whether a deviation between the adjusted light output direction determined in step 109 and the daylight-mimicking light output direction determined in step 105 is below a predetermined maximum. If it is determined in step 111 that this deviation is below the predetermined maximum, then a step 113 is performed. Step 113 comprises controlling the one or more light sources to render the light output in the adjusted light output direction.

In step 113, the one or more light sources in the room are controlled to generate the adjusted daylight simulation output based on the adjusted daylight simulation (e.g. deviated sunbeam trajectory). The one or more light sources may comprise, for example, a virtual skylight able to generate a wide variety of beam angles, or multiple different lighting devices (e.g. diffuse and directional) to simulate a daylight effect in a room.

If it is determined in step 111 that this deviation is not below the predetermined maximum, then a step 115 is performed. Step 115 comprises rendering diffused light. Thus, if the deviation is not below the predetermined maximum, the one or more light sources are not controlled to render the light output in the adjusted light output direction. This ensures that any deviation stays below the predetermined maximum.

Figure 3:
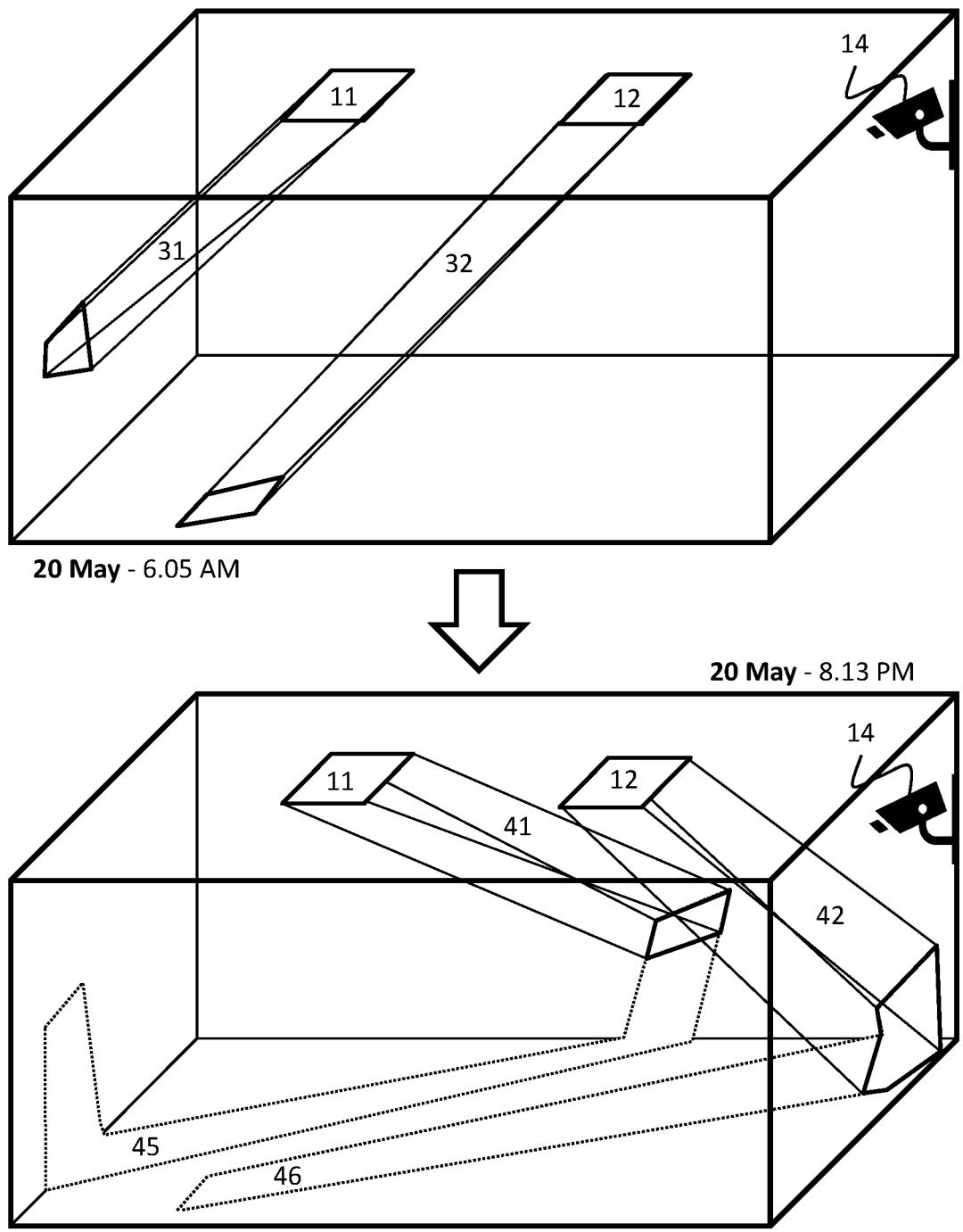
FIG. 3 shows an example of daylight-mimicking light output directions changing during the day.

FIG. 3 shows an example of daylight-mimicking light output directions changing during the day. The top half of FIG. 3 shows light sources 11 and 12 of FIG. 1 rendering light output/beams in first daylight-mimicking light output directions 31 and 32, respectively, at 6.05 AM on 20 May. The bottom half of FIG. 3 shows light sources 11 and 12 rendering light output/beams in last daylight-mimicking light output directions 41 and 42, respectively, at 8.13 PM on 20 May. The bottom half of FIG. 3 also shows the trajectories 45 and 46 of the light beams, as projected on the walls and floor, during the day.

Figure 4:
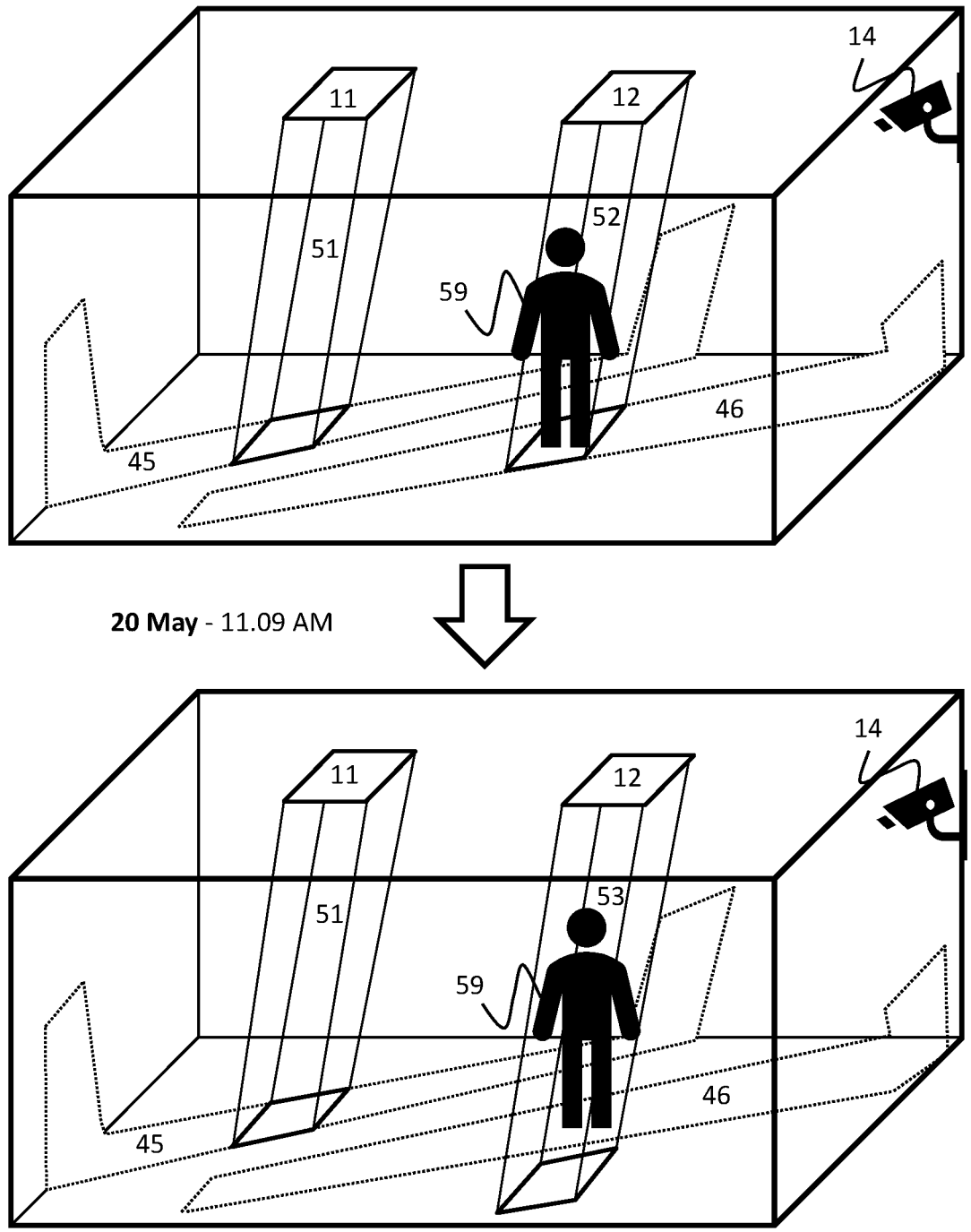
FIG. 4 shows a first example of an adjusted light output direction.

FIG. 4 shows a first example of an adjusted light output direction. The top half of FIG. 4 shows light sources 11 and 12 rendering light output/beams in further daylight-mimicking light output directions 51 and 52, respectively, at 11.09 AM on 20 May. In the example of FIG. 4, the processor 5 of the controller 1 of FIG. 1 is configured to determine an adjusted light output direction such that the light output does not illuminate any person. Since camera 14 detects that a person 59 is illuminated by the daylight-mimicking light output in light output direction 52, see the top half of FIG. 4, an adjusted light output direction is determined. The adjusted light output direction 53, see the bottom half of FIG. 4, does not illuminate the person 59. In the example of FIG. 4, only the light output direction 52 is adjusted (into light output direction 53), but the light output direction 51 is not adjusted. Alternatively, the light output direction 51 may also be adjusted, e.g. with the same deviation.

In the example of FIG. 4, the reference trajectory 46 is only adjusted at the detected position of person 59. If the determined position is a typical user position, the entire reference trajectory 46 may be adjusted, as shown in FIG. 5.

Figure 5:
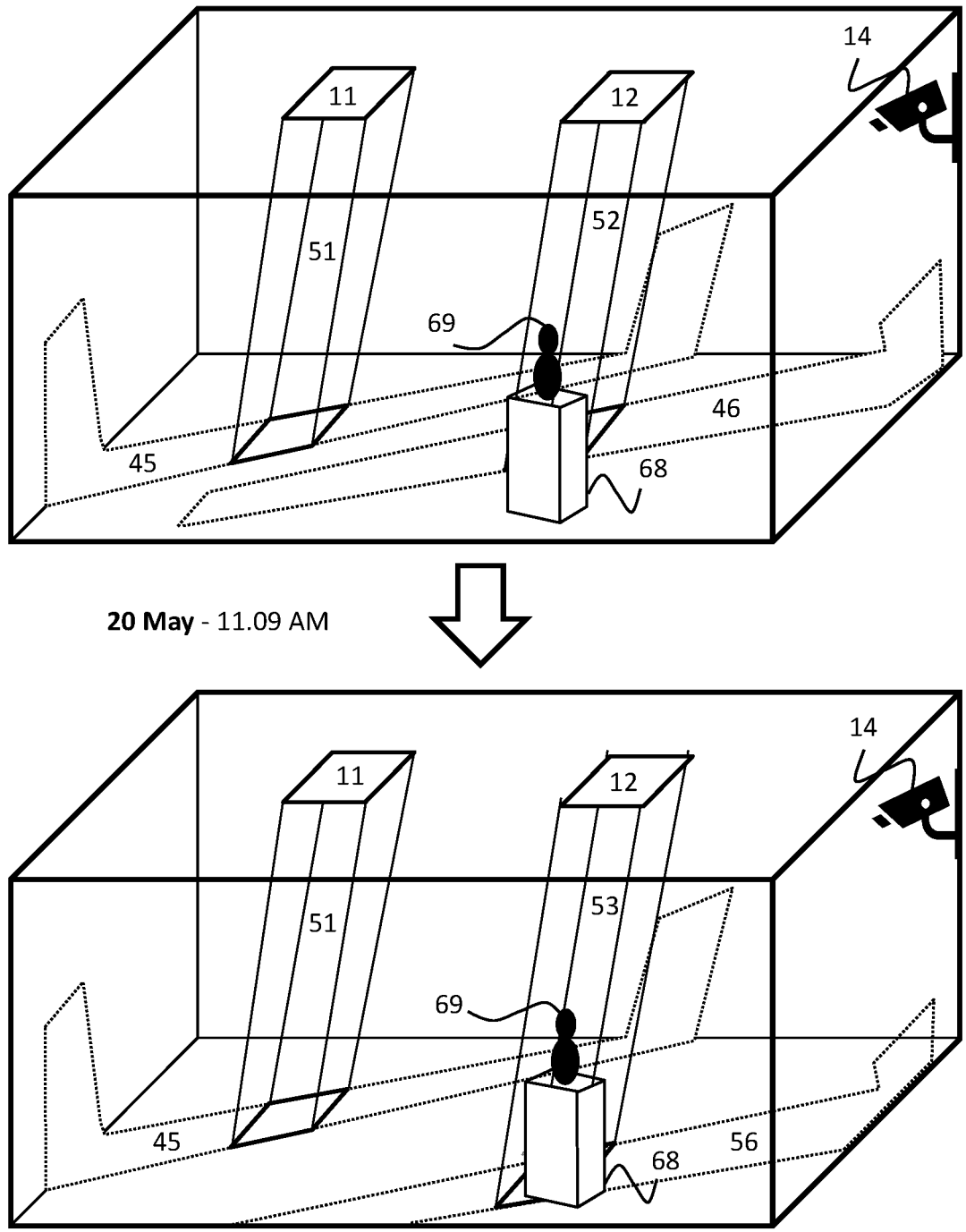
FIG. 5 shows a second example of an adjusted light output direction.

FIG. 5 shows a second example of an adjusted light output direction. The top half of FIG. 5 shows light sources 11 and 12 rendering light output/beams in further daylight-mimicking light output directions 51 and 52, respectively, at 11.09 AM on 20 May. In the example of FIG. 5, the processor 5 of the controller 1 of FIG. 1 is configured to determine an adjusted light output direction such that the light output illuminates certain objects. Since camera 14 detects that the daylight-mimicking light output in light output direction 52 just misses the art object 69 standing on table 68 (i.e. does not illuminate it), an adjusted light output direction is determined. The adjusted light output direction 53, see the bottom half of FIG. 5, does illuminate the object 69.

In the example of FIG. 5, the reference trajectory 46 is replaced with a deviated trajectory 56, but the reference trajectory 45 is not adjusted. Alternatively, the reference trajectory 45 may also be adjusted, e.g. with the same deviation. This is especially beneficial if the deviation is relatively large. It is typically more believable to keep the light output directions of the light sources 11 and 12 the same so that their beams remain parallel than to let light sources 11 and 12 use different light output directions.

Figure 6:
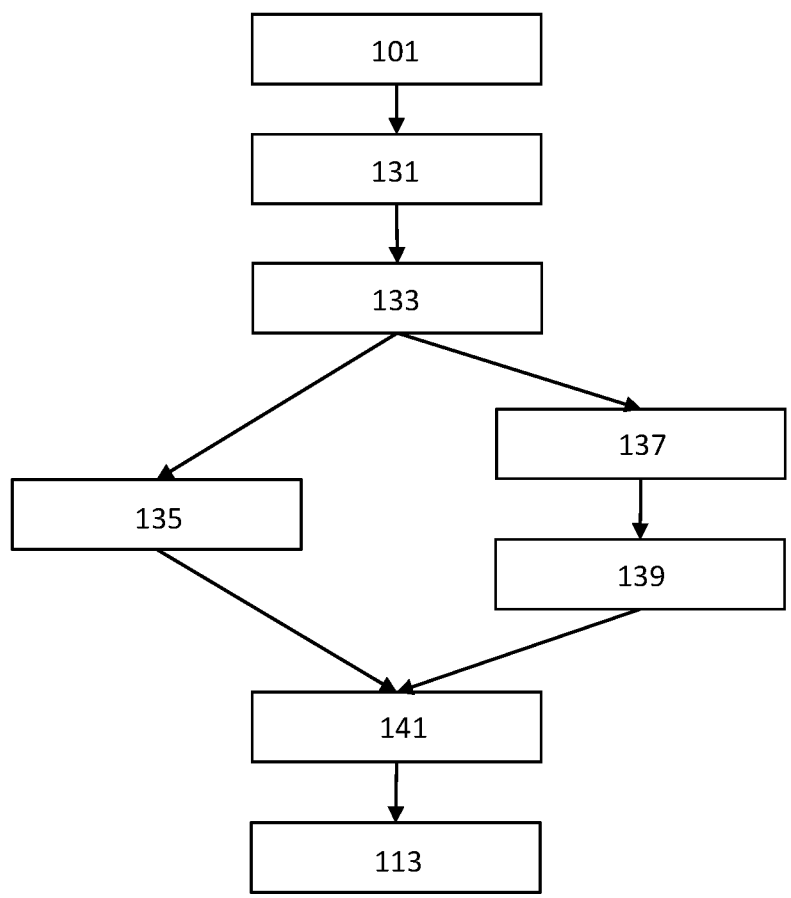
FIG. 6 is a flow diagram of a second embodiment of the method.

A second embodiment of the method of mimicking daylight in a space by using one or more light sources having a redirectable light output is shown in FIG. 6. Step 101 comprises determining a current time of day. A step 131 comprises determining a daylight-mimicking light output direction for the light output in the space based on a time of day and optionally, further daylight-mimicking light output directions based on other times of day.

In step 131, a first daylight simulation output for one or more daylight mimicking lighting units may be determined, preferably based on input on the current season or current date and the geo-position and -orientation. For instance, daylight models may be queried using the system's current date and geo-location in order to retrieve a pre-defined dynamic daylight simulation scheme which would represent the actual ambient lighting conditions at that location. This daylight simulation output may include a daylight-mimicking light output direction based on multiple times, e.g. each time, of day or only a daylight-mimicking light output direction based on the current time of day.

Step 133 comprises obtaining images from a camera, detecting a person in the images and determining a position of the person from the images. Steps 135 and 137 are performed after step 133. Step 135 comprises determining an activity performed by the person from the images obtained in step 133.

In the embodiment of FIG. 6, (only) camera images are analyzed to determine the activity performed by the person. Alternatively or additionally, one or more other sensors may be used. For example, microphones may be used to detect the activity performed by the person or data from one or more (RF-based) motion sensors may be analyzed in order to assess the number of users present or the activity happening in the room. The sensors could either be separate devices or could be integrated as part of the daylight-mimicking lighting units.

Alternatively or additionally, the activity performed by the person may be determined from user input, e.g. be user-defined during the configuration stage, or from an agenda, for example. For instance, the system may have access to the agenda of people present in the room or of the agenda of a (meeting) room, and that this input may be used to determine the activity in the room.

Step 137 comprises identifying the person from the images obtained in step 133. A step 139 comprises determining a preference associated with the identified person. For instance, a user may have indicated that he does not mind if the sunlight shines on his face, as long as it is not too bright. In this case, the trajectory of the sunbeam may be maintained while the brightness of the sunbeam will simply be dimmed back while the sunbeam it is detected to be co-located with that user.

Another user may have indicated that a sunbeam on his face or body is fine, but that it should last no longer than a few minutes. In that case, the virtual sunbeam could move a bit faster along its reference trajectory for the duration that it shines on the user. A user may also have indicated that the sunbeam should preferably create a (infra-red based) heat sensation, especially during wintertime. This heat sensation may be generated by the same luminaire that projects the sunbeam or by a device dedicated to generating a heat sensation.

In the embodiment of FIG. 6, step 135 is performed at least partly in parallel with steps 137 and 139. In an alternative embodiment, step 135 is performed before step 137, after step 139, or between steps 137 and 139.

A step 141 comprises determining an adjusted light output direction for the one or more light sources in dependence on the daylight-mimicking light output direction determined in step 105 and the estimated or detected position obtained in step 107. In the embodiment of FIG. 6, the adjusted light output direction is further determined based on the activity determined in step 135 and/or the preference determined in step 139. The adjusted light output direction may be determined such that the light output does not illuminate the person, for example.

In step 141, a corresponding daylight simulation effect may be determined based on the determined user activity. The determined user activity may indicate a physical activity, e.g. reading, cooking, or a "digital" activity indicated by a digital device (e.g. TV, smartphone, computer). For example, when the user is determined to be relaxing, a sun beam may illuminate a region close to the user and when the user is determined to be working, a sun beam may illuminate a region away from the user.

The selected daylight simulation for each detected input could be retrieved from a simple look-up table and/or could be based on indicated user preferences and/or learned from daylight control interventions from the user. The color and/or intensity of the light may depend on a detected mood of the user. As a first example, the light output may have a color with a color saturation exceeding a certain minimum when laughter is detected and a color saturation below a certain maximum when laziness (e.g. limited physical and digital activity) is detected. As a second example, the light output may be lowered compared to a default light output when aggression is detected (to calm the user down).

Step 113 comprises controlling the one or more light sources to render the light output in the adjusted light output direction. In this step, the one or more daylight-mimicking light units in the room may be controlled to generate the adjusted daylight simulation output. Such a light unit could be a virtual skylight able to generate a wide variety of beam angles, or it could be a system with multiple different lighting devices (e.g. diffuse and directional) to simulate a daylight effect in a room.

If a daylight simulation output was determined in step 131 that includes a daylight-mimicking light output direction for each time of day, the current time of day determined in step 101 may be used in step 113 to select the currently applicable light output direction from the daylight simulation output based on the determined current time of day. In this case, step 101 could alternatively be performed between steps 141 and 113. If the daylight simulation output is determined in real-time, the current time of day determined in step 101 may already be used in step 131.

Figure 7:
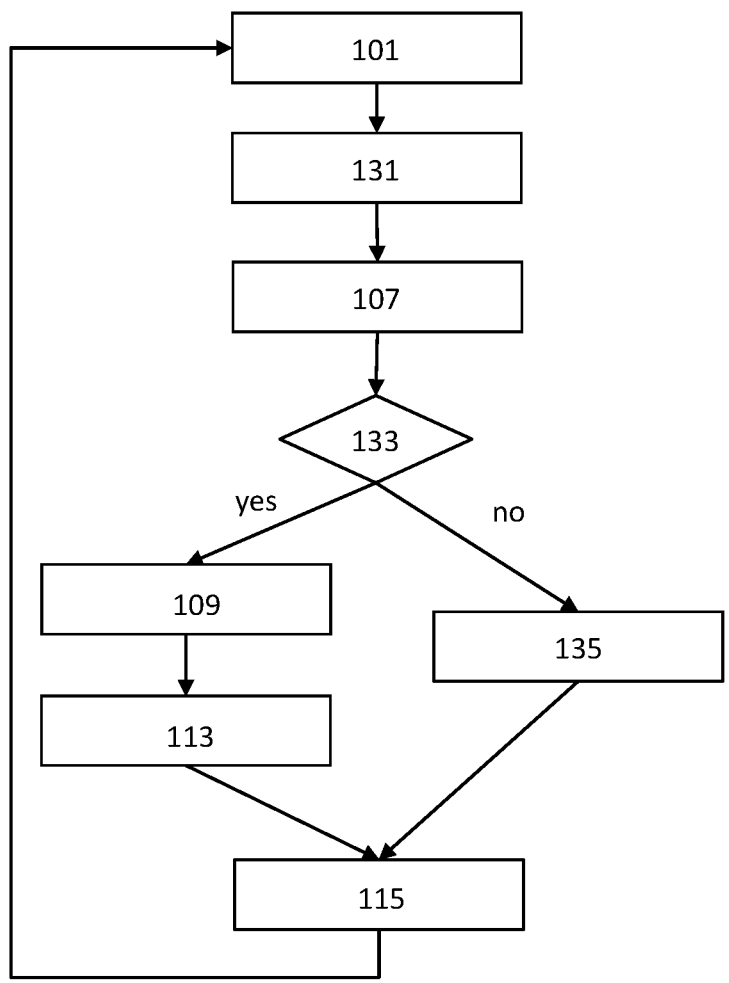
FIG. 7 is a flow diagram of a third embodiment of the method.

A third embodiment of the method of mimicking daylight in a space by using one or more light sources having a redirectable light output is shown in FIG. 7. Step 101 comprises determining a current time of day. Step 131 comprises determining a daylight-mimicking light output direction for the light output in the space based on the current time of day determined in step 101.

Step 107 comprises determining an estimated or detected position of an object, person or animal in the space. Step 133 comprises determining whether the daylight-mimicking light output direction determined in step 105 should be adjusted based on the estimated or detected position obtained in step 107. As a first example, if an adjustment of the light output direction below a predetermined maximum would allow an object, person or animal to be illuminated when the object, person or animal would otherwise not be illuminated, then this adjustment may be considered to be desired or necessary.

As a second example, if an adjustment of the light output direction below a predetermined maximum would avoid illuminating an object, person or animal when the object, person or animal would otherwise be illuminated, then this adjustment may be considered to be desired or necessary.

If it is determined in step 133 that the daylight-mimicking light output direction should be adjusted, then step 109 is performed. Step 109 comprises determining an adjusted light output direction for the one or more light sources in dependence on the daylight-mimicking light output direction determined in step 131 and the estimated or detected position obtained in step 107. Step 113 comprises controlling the one or more light sources to render the light output in the adjusted light output direction determined in step 109.

If it is determined in step 133 that the daylight-mimicking light output direction should not be adjusted, then step 135 is performed. Step 135 comprises controlling the one or more light sources to render the light output in the daylight-mimicking light output direction determined in step 131.

At a later time, after a while, a step 115 is performed as a transition between the light output rendered in the daylight-mimicking light output direction or in the adjusted light output direction and light output rendered in a further daylight-mimicking direction or in a further adjusted direction (which is based on the further daylight-mimicking direction). Step 115 comprises rendering diffused light. Step 101 is repeated after step 115 and the method proceeds as shown in FIG. 7.

The system generating the virtual sunbeam may have limitations. For example, this system may only be able to provide lights at certain positions or certain trajectories rather than have total freedom to illuminate all possible areas. In that case, the system has to choose from the possible positions/trajectories that are possible given the limitations, to optimize for the "avoiding" and "highlighting" effects.

Figure 8:
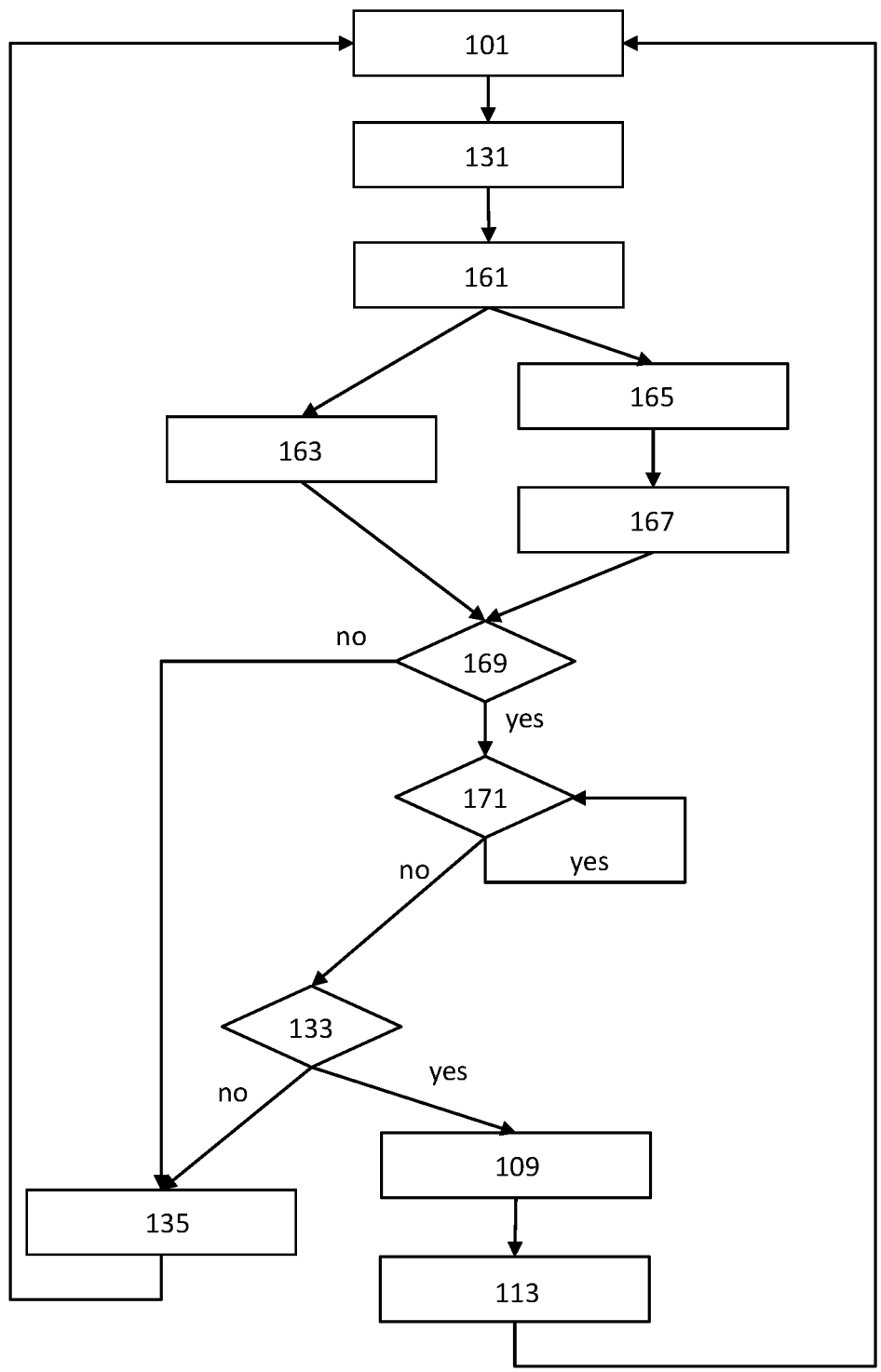
FIG. 8 is a flow diagram of a fourth embodiment of the method.

The embodiment of FIG. 7 is beneficial, for example, in the case where the possible positions are quantized. In this case, the system needs to avoid situations where the user sees the sunbeam switching from one position to another. In the embodiment of FIG. 7, this may be achieved by going through a "cloudy" intermission (sunny at position 1=>cloudy=>sunny at position 2). In the embodiment of FIG. 8, this may be achieved by switching position when the user is not present or not watching the impacted area.

In the embodiment of FIG. 7, the light output directions are determined in real-time based on the current time of day. In an alternative embodiment, the light output directions are determined in advance based on multiple times of the day. In this alternative embodiment, steps 113, 135 and 115 may comprise determining the above-mentioned light settings without controlling the one or more light sources according these light settings. Controlling the one or more light sources according to these light settings may then be performed at the specified times in real-time in an additional step. Step 101 is performed before this additional step.

In the fourth embodiment of the method of mimicking daylight in a space by using one or more light sources having a redirectable light output, shown in FIG. 8, step 101 comprises determining a current time of day. Step 131 comprises determining a daylight-mimicking light output direction for the light output in the space based on the current time of day determined in step 101. A step 161 comprises obtaining images from a camera.

A step 163 comprises obtaining presence information indicative of whether a person is present from the images obtained in step 161 and if a person is present, determining a position of the person from the images obtained in step 161. A step 165 comprises obtaining an orientation gaze direction and/or eye state of the person from the images obtained in step 161. They eye state may be open or closed, for example. A step 167 comprises determining whether the person can see and/or is looking at the light output being rendered in a current direction based on the orientation, gaze direction and/or eye state determined in step 165.

In the embodiment of FIG. 8, step 163 is performed at least partly in parallel with steps 165 and 167. In an alternative embodiment, step 163 is performed before step 165, after step 167, or between steps 165 and 167.

A step 169 comprises checking based on the presence information obtained in step 161 whether a person is present in the space. If so, a step 171 is performed. If not, step 135 is performed. Step 171 comprises checking whether the person can see and/or is looking at the light output currently being rendered based on the information determined in step 167. If the person cannot see or is not looking at the light output currently being rendered, step 133 is performed. Otherwise, step 133 is performed as soon as the person can no longer see or is no longer looking at the light output currently being rendered.

Step 133 comprises determining whether the daylight-mimicking light output direction determined in step 105 should be adjusted based on the estimated or detected position obtained in step 163. If it is determined in step 133 that the daylight-mimicking light output direction should be adjusted, then step 109 is performed. Step 109 comprises determining an adjusted light output direction for the one or more light sources in dependence on the daylight-mimicking light output direction determined in step 131 and the estimated or detected position obtained in step 163. Step 113 comprises controlling the one or more light sources to render the light output in the adjusted light output direction determined in step 109.

If it is determined in step 133 that the daylight-mimicking light output direction should not be adjusted, then step 135 is performed. Step 135 comprises controlling the one or more light sources to render the light output in the daylight-mimicking light output direction determined in step 131. Step 101 is repeated after steps 113 and 135 and the method proceeds as shown in FIG. 8.

In the embodiment of FIG. 8, the daylight-mimicking light output direction is adjusted if no person is detected in the space. In an alternative embodiment, an energy-saving mode (dimmed, cloudy) may be activated if no person is detected in the space. For example, step 115 of FIG. 7 may be added to the embodiment of FIG. 8 and performed (instead of step 135) if it is determined in step 169 that no person is present in the space. When the user enters the space, there could then be a gradual transition to sunny.

The embodiments of FIGS. 2 and 6-8 show various aspects of the invention. In alternative embodiments, multiple of these aspects are combined. For example, step 139 of FIG. 6, in which a preference associated with the identified person is determined, may also be performed in other embodiments.

Figure 9:
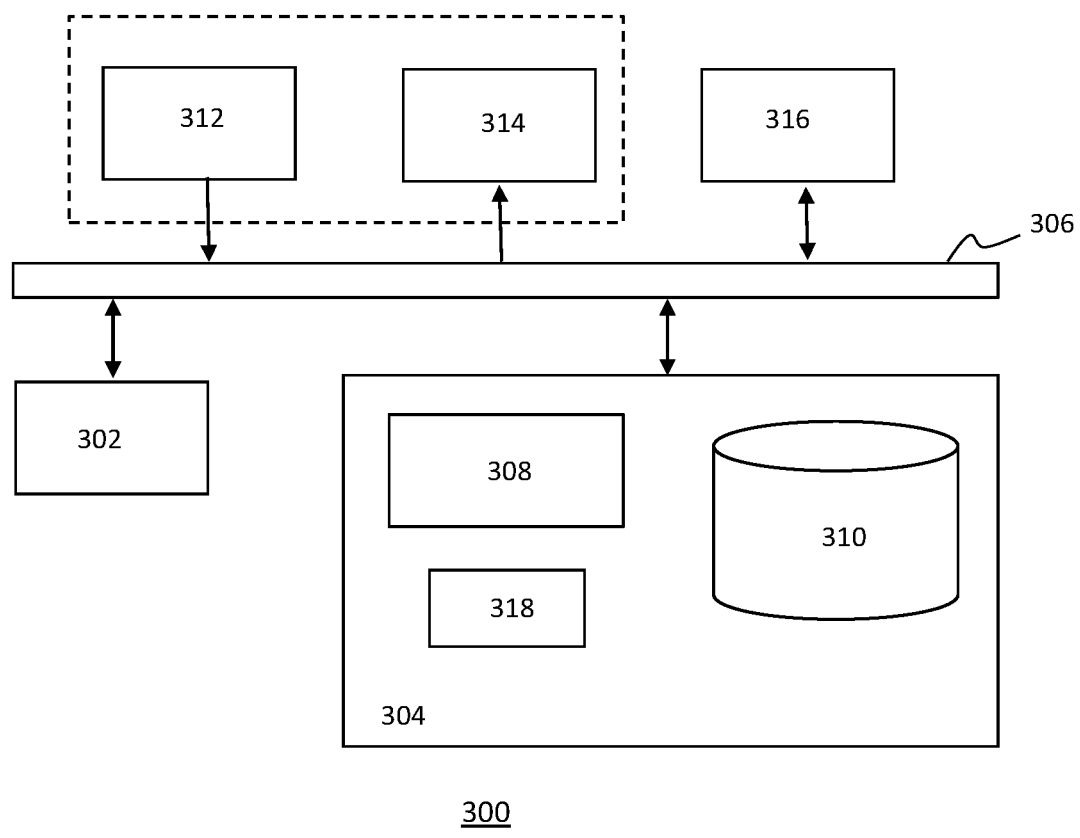
FIG. 9 is a block diagram of an exemplary data processing system for performing the method of the invention.

FIG. 9 depicts a block diagram illustrating an exemplary data processing system that may perform the method as described with reference to FIGS. 2 and 6-8.

As shown in FIG. 9, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 9, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 9) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for mimicking daylight in a space by using one or more light sources having a redirectable light output, said system comprising:
    at least one input interface;
    at least one control interface; and
    at least one processor configured to:
        determine a daylight-mimicking light output direction for said light output in said space based on a time of day,
        obtain input via said at least one input interface,
        determine an estimated or detected position of a person or animal in said space from said input,
        determine an adjusted light output direction for said one or more light sources in dependence on said daylight-mimicking light output direction and said estimated or detected position, and
        control, via said at least one control interface, said one or more light sources to render said light output in said adjusted light output direction.

2. A system as claimed in claim 1, wherein said at least one processor is configured to:
    obtain a geographic location and/or a spatial orientation of said one or more light sources, said spatial orientation indicating a direction relative to a geographic cardinal direction, and
    determine said daylight-mimicking direction for said light output further based on said geographic location and/or said spatial orientation.

3. A system as claimed in claim 1, wherein said at least one processor is configured to determine said adjusted light output direction such that a deviation between said adjusted light output direction and said daylight-mimicking light output direction stays below a predetermined maximum.

4. A system as claimed in claim 1, wherein said at least one processor is configured to determine said adjusted light output direction such that said light output illuminates said person or animal.

5. A system as claimed in claim 1, wherein said at least one processor is configured to determine said adjusted light output direction such that said light output does not illuminate said person or animal.

6. A system as claimed in claim 1, wherein said position is of a person and at least one processor is configured to determine said adjusted light output direction further in dependence on an activity performed by said person.

7. A system as claimed in claim 1, wherein said position is of a person and said at least one processor is configured to:
    identify said person,
    determine a preference associated with said identified person, and
    determine said adjusted light output direction further in dependence on said preference.

8. A system as claimed in claim 1, wherein said at least one processor is configured to:
    determine a further daylight-mimicking direction for said light output based on a later time of day,
    control, via said at least one control interface, said one or more light sources to render diffused light,
    control, via said at least one control interface, said one or more light sources to render said light output in said further daylight-mimicking direction or a further adjusted direction after rendering said diffused light, said further adjusted direction being based on said further daylight-mimicking direction.

9. A system as claimed in claim 1, wherein said at least one processor is configured to:
    determine a further daylight-mimicking direction for said light output based on a later time of day,
    obtain, via said at least one input interface, presence information indicative of whether a person is present,
    control, via said at least one control interface, said one or more light sources to render said light output in said further daylight-mimicking direction or a further adjusted direction upon determining that said person is not present, said further adjusted direction being based on said further daylight-mimicking direction.

10. A system as claimed in claim 9, wherein said at least one processor is configured to:
    obtain, via said at least one input interface, an orientation, gaze direction and/or eye state of said person,
    determine whether said person can see and/or is looking at said light output being rendered in a current direction based on said orientation, gaze direction and/or eye state,
    control, via said at least one control interface, said one or more light sources to render said light output in said further daylight-mimicking direction or said further adjusted direction upon determining that said person cannot see or is not looking at said light output being rendered in said current direction.

11. A system as claimed in claim 1, wherein said at least one processor is configured to determine said detected position of said person based on a detected position of a mobile device carried, worn or held by said person.

12. A method of mimicking daylight in a space by using one or more light sources having a redirectable light output, comprising:
- determining a daylight-mimicking light output direction for said light output in said space based on a time of day;
- determining an estimated or detected position of a person or animal in said space;
- determining an adjusted light output direction for said one or more light sources in dependence on said daylight-mimicking light output direction and said estimated or detected position; and
- controlling said one or more light sources to render said light output in said adjusted light output direction.

13. A non-transitory computer program or suite of non-transitory computer programs comprising at least one software code portion or a computer program product storing at least one software code portion, the software code portion, when run on a computer system, being configured for performing the method of claim 12.

* * * * *